F. C. YOUNG.
INSECT CATCHING DEVICE.
APPLICATION FILED OCT. 28, 1911.
1,033,975.
Patented July 30, 1912.
2 SHEETS—SHEET 1.
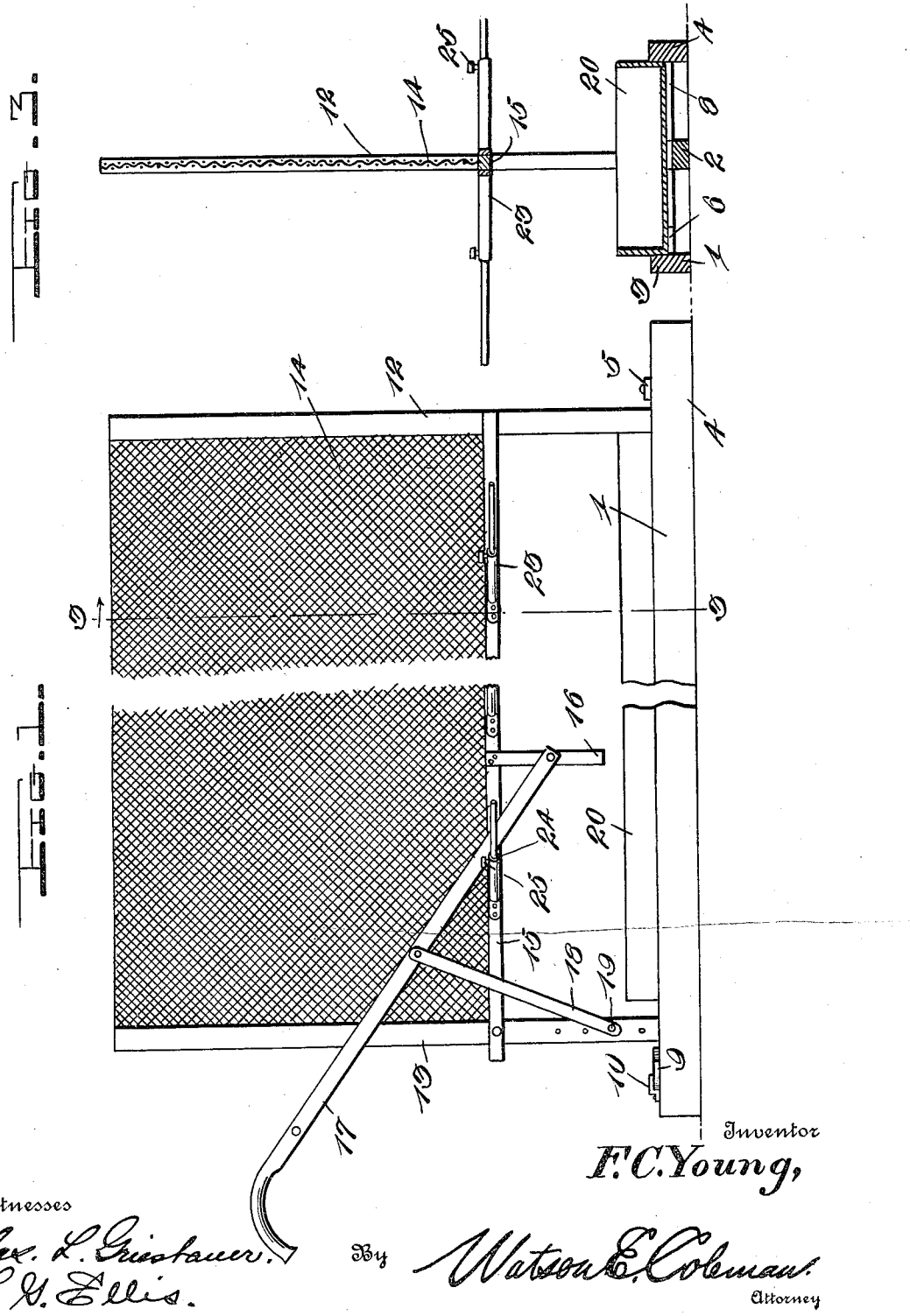

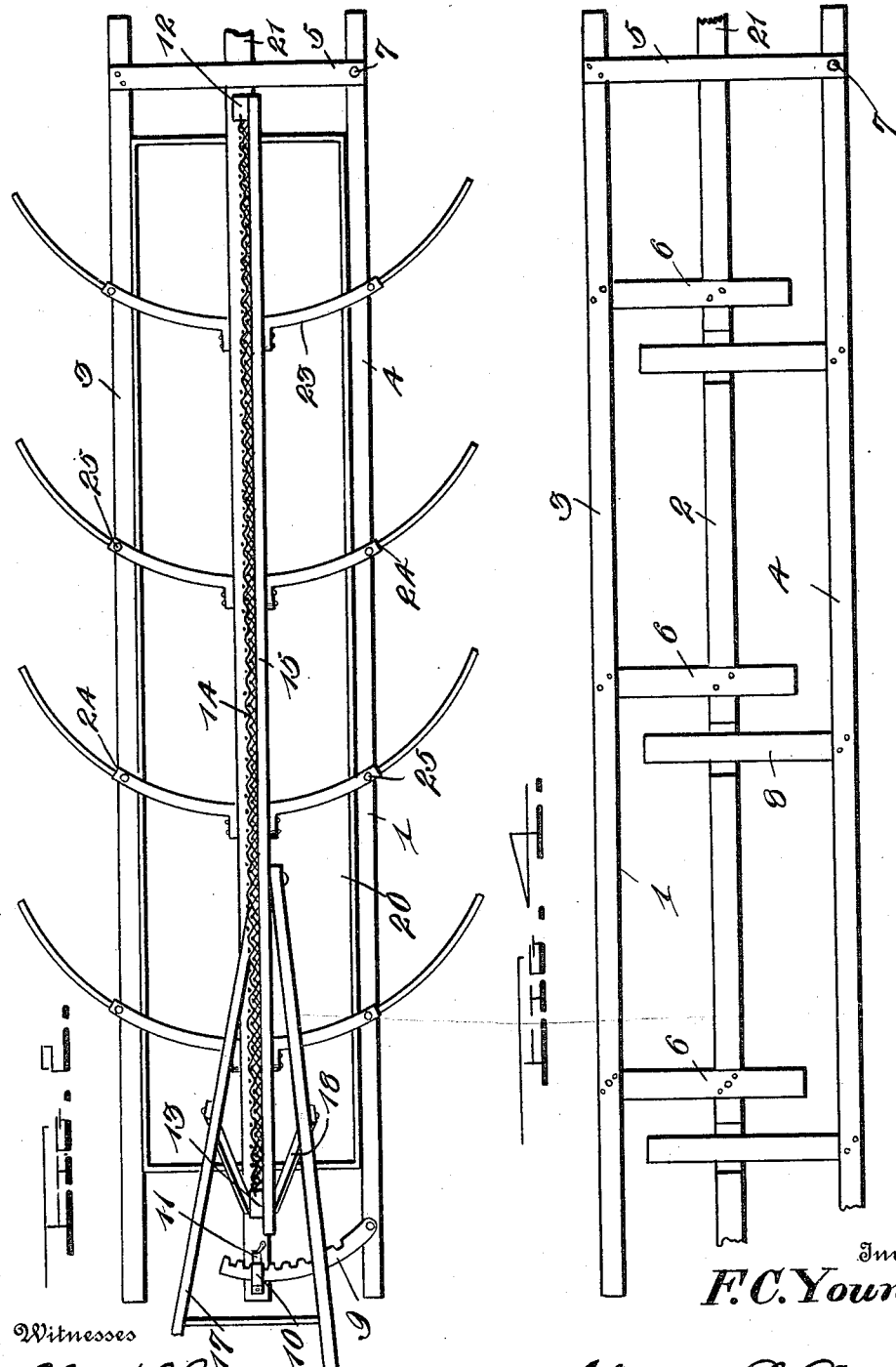

UNITED STATES PATENT OFFICE.

FLETCHER C. YOUNG, OF RAYMOND, MISSISSIPPI.

INSECT-CATCHING DEVICE.

1,033,975.　　　　　Specification of Letters Patent.　　Patented July 30, 1912.

Application filed October 28, 1911. Serial No. 657,205.

*To all whom it may concern:*

Be it known that I, FLETCHER C. YOUNG, a citizen of the United States, residing at Raymond, in the county of Hinds and State of Mississippi, have invented certain new and useful Improvements in Insect-Catching Devices, of which the following is a specification, reference being had to the accompanying drawings.

My invention relates to new and useful improvements in insect destroyers and more particularly to a boll-weevil catcher, and my object is to provide a device of this character which may be readily drawn between the rows of cotton and cause the insects thereon to drop therefrom onto the device and be carried away.

A further object of the invention resides in providing a device wherein the body portion or slides thereof are formed in sections adjustable with respect to one another, and still another object of the invention resides in providing a dividing wall between the sections formed of a screening material.

A still further object of the invention resides in providing catch rods on the device which are adapted to engage the cotton stalks and shake the same as the device is propelled between the rows, and a still further object resides in providing means for the adjustment of these catch rods to compensate for the differences in the width between rows on different fields.

A further object of the invention resides in providing a device which is extremely simple in construction, thereby readily and cheaply manufactured, one which is durable in construction and very efficient and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a side elevation of the device. Fig. 2 is a top plan view thereof. Fig. 3 is a vertical section through the device as seen on line 3—3, Fig. 1, and, Fig. 4 is a plan view of the body portion or slides of the device in their open position and the catching receptacles or pans removed.

In carrying out my invention, I shall refer to the drawings in which similar reference characters designate corresponding parts throughout the several views and in which—

1 indicates a frame comprising a central longitudinal bar 2, a pair of longitudinal side bars 3 and 4 and an end bar 5. The end bar 5 is permanently secured to the side bar 3, and said latter side bar is further held in parallel spaced alinement from said central bar throughout its length by the transverse bars 6 which are secured to the longitudinal bars 2 and 3, respectively, and extend beyond the central bar 2 to points immediately adjacent the side bar 4. These bars may be formed of any desired material, whatsoever, preferably metal, the side bar 4 being pivoted adjacent its forward end to the end bar 5, as shown at 7, and said side bar 4 is provided with a plurality of transverse bars 8 which are adapted to rest freely on the central bar 2, and when said bar 4 is in parallel alinement throughout its length with the central bar, the free ends of said transverse bars 8 are disposed immediately adjacent the opposite side bar 3.

From the construction just described, it will be seen that the frame 1 is formed in sections, the one section being movable with respect to the other, in view of the fact that the side bar 4 is pivoted to the end bar 5, and in order to retain said side bar 4 in its substantial closed position or in any other adjusted open position, the arcuate rack 9 is provided adjacent the rear end of the side bar 4 which extends through a keeper 10 on the longitudinal bar 2, the teeth of which are adapted to be engaged by a spring-held pawl or detent 11. The side bar 4 may, therefore, be opened to any degree or closed and may be retained in its adjusted position through this last referred to means. This frame 1, composed of the various longitudinal and transverse bars, as described, is elongated and adapted to be drawn along the surface of the ground, the side bars 3 and 4 forming slides or the like therefor, and mounted on the central longitudinal bar 4 adjacent its front and rear ends, are the standards 12 and 13, respectively, said standards forming the ends of a frame which carries a wire screen wall 14.

Depending from the longitudinal lower bar 15 of the frame carrying the wire screen, is a post or the like 16 which extends to a point a short distance above the central longitudinal bar 2, and engaged therewith, are the ends of a pair of handle members 17, said handle members being extended beyond the rear standard 13 to be grasped by an operator, whereby the device may be moved forward or guided over the desired territory. These handle members extend on opposite sides of the wall 14 and are braced by means of the brace rods 18 which extend from said handle members to a pin or bolt 19 which is adjustably mounted in the lower end of the rear standard 13, whereby said handle members may be raised or lowered with respect thereto.

As stated, the side bar 4 is adjustable with respect to the other portions of the frame 1 and adapted to be mounted on said frame between the longitudinal side bars, is an elongated pan or receptacle 20 which may be filled with any desired insect exterminating substance, and it will be appreciated that when properly seated upon the frame 1 and the longitudinal bar 4 brought to its closed position, said pan will be securely retained on the frame.

The end bar 5 has secured thereto, a draw bar 21 which carries a swingletree or the like (not shown) whereby a draft may be applied to the frame so as to draw the device over the ground, and in order to provide means for the engagement of the cotton or other stalks as the device is propelled so as to shake the insects therefrom, I provide the laterally extending catch rods 23. These rods are somewhat arcuate in design and extend laterally from both sides of the longitudinal bar 15 so that as the device is drawn forwardly between the rows, the same will engage the stalks, thereby shaking the same and causing the insects to drop therefrom into the pan 20, and in order to provide means whereby these rods will always engage the stalks, no matter how great the space between the rows, the same are made adjustable. In making these rods adjustable, the same are telescoped, as shown at 24, and a set screw 25 extending through the outer section thereof retains the sections of the rods in any of their adjusted positions.

In practice, a pan is first placed on the frame 1 and the side bar 4 of said frame brought to its closed position so as to securely retain the pan upon the frame, whereupon the operator, guiding the device from the rear through the handles 17, drives said device between the rows of the plants from which the insects are adapted to be removed. The operator will, of course, determine the width of the space between the rows and adjust the rods or arms 23 accordingly, and as the device is driven forwardly between said rows, said arms or rods 23 will contact with the stalks, which are preferably cotton, to move the same and shake the insects therefrom. As these stalks are shaken, certain of the insects will drop immediately to the pan 20 on the frame of the device, while certain others will be shaken against the screen wall 14 from where they will drop downwardly to the pan therebelow, and as said pan is adapted to contain an insect exterminating substance, it will be seen that said insects will be caught and exterminated at the same time. When the pan has become sufficiently filled and it is desired to empty the same, the side bar 4 of the frame may be readily moved outwardly by the release of the pawl 11 from engagement with the teeth of the rack 9, whereupon the pan may be removed from the frame and the contents emptied therefrom.

From the foregoing, it will be seen that I have provided an improved insect exterminating device, which is particularly adapted for the extermination of boll-weevils from cotton stalks wherein a body portion which is adapted to slide over the surface of the ground, is formed in sections adapted to retain therebetween a pan, and furthermore, it will be seen that I have provided a central wall above the pan, from which extend the lateral arms or catch rods to engage the stalks to cause the insects therefrom to drop upon the pan therebelow after the device is drawn forwardly. Furthermore, it will be seen that I have provided means for the adjustment of the laterally extending arms or catch rods, whereby the same are adapted to engage stalks of two rows, no matter what the distance between the same may be. It will still further be seen that the device is one of simple and durable construction, whereby the same may be readily and cheaply manufactured, and is extremely efficient and useful in operation.

While I have shown a single pan 20 in connection with this device, it will be understood that, if desired, a pair of pans may be provided or substituted for this single pan, and in the use of such a pair of pans, it will be appreciated that the one will be substantially immovable, in view of its being mounted on the portion of the frame which is stationary, while the other pan will be substantially movable, being mounted on that portion of the frame which is adapted to be moved. In this connection, it might also be stated that various changes in form, proportion and in the minor details of construction may be resorted to without departing from the spirit or sacrificing any of the principles of the invention.

What I claim is:—

1. An insect catching device comprising a base portion adapted to slide on the surface of the ground, said base being formed in sections pivoted one to the other, means for the retention of said sections together, a receptacle securely held between the sections of said base, a central longitudinal wall carried on the base above the receptacle thereon, and a plurality of arms extending laterally from said wall.

2. An insect catching device comprising a base adapted to move on the surface of the ground, said base being formed in sections pivoted one to the other, means for the retention of said sections together, a receptacle resting on said base and securely held between the sections thereof, a wall extending longitudinally of the base above said receptacle, a plurality of arms extending laterally from said wall, and means for the adjustment of said arms.

3. An insect catching device comprising a base adapted to move on the surface of the ground, said base being formed in sections pivoted one to the other, means for the retention of said sections together, a receptacle securely held on said base between the sections thereof, a wall extending longitudinally of the base and above said receptacle, a plurality of laterally extending arms carried on said wall, and means for the adjustment of said arms.

4. An insect catching device of the class described, comprising a base adapted to move on the surface of the ground, a receptacle mounted thereon, a wall extending longitudinally of the base and above said receptacle, a plurality of arms extending laterally from both sides of said wall and means for the lateral adjustment of said arms.

In testimony whereof I hereunto affix my signature in the presence of two witnesses.

FLETCHER C. YOUNG.

Witnesses:
T. D. McMANUS,
J. M. HEITMAN.

---

Copies of this patent may be obtained for five cents each, by addressing the "Commissioner of Patents, Washington, D. C."